United States Patent [19]

Farr

[11] 4,232,909
[45] Nov. 11, 1980

[54] VEHICLE LOAD SENSING ASSEMBLIES

[75] Inventor: Glyn P. R. Farr, Leek Wootton, England

[73] Assignee: Girling Limited, Birmingham, England

[21] Appl. No.: 907,583

[22] Filed: May 19, 1978

[30] Foreign Application Priority Data

May 19, 1977 [GB] United Kingdom ............... 21204/77

[51] Int. Cl.³ ............................................. B60T 8/18
[52] U.S. Cl. ................................. 303/22 R; 180/290; 188/195
[58] Field of Search .................. 303/22 R; 188/195; 180/100

[56] References Cited

U.S. PATENT DOCUMENTS

| | | | |
|---|---|---|---|
| 3,802,750 | 4/1974 | Kawai | 303/22 R |
| 3,884,532 | 5/1975 | Deschenes | 303/22 R |
| 3,997,735 | 8/1976 | Bush et al. | 303/22 R |
| 4,062,597 | 12/1977 | Sawyer et al. | 303/22 R X |

FOREIGN PATENT DOCUMENTS 2411437  9/1975  Fed. Rep. of Germany ........ 303/22 R

*Primary Examiner*—John J. Love
*Assistant Examiner*—Milton L. Smith
*Attorney, Agent, or Firm*—Scrivener, Parker, Scrivener and Clarke

[57] ABSTRACT

A vehicle load-sensing assembly for use with a vehicle fluid-pressure braking system comprises an input member subjected to a force in a road spring and a valve which has a movable valve member for controlling the flow of fluid through the valve. A thrust transmitting mechanism is located between the input member and the valve member. The thrust transmitting mechanism comprises relatively movable parts, and a camming device is disposed between the parts to transmit movement between the parts to control operation of the valve member.

6 Claims, 6 Drawing Figures

VEHICLE LOAD SENSING ASSEMBLIES

SPECIFIC DESCRIPTION

This invention relates to vehicle load sensing assemblies for vehicle braking systems in which the brake pressure effort is varied in dependence upon vehicle loading.

Normally, such braking systems have a brake pressure control valve, in the form of a pressure-reducing or limiting valve, fitted in the brake line between rear wheel brakes and a source of fluid pressure. The "cut-in" point at which the valve cuts off the pressure fluid to the rear wheel brakes or reduces the pressure relative to the pressure applied to the front wheel brakes is often dependent upon the vehicle loading.

The vehicle loading may be sensed by determining relative movement between a sprung and an unsprung part of the vehicle, for example the chassis and the rear axle.

Previously proposed load sensing assemblies comprise a control spring the force of which determines the valve cut-in value for "minimum load" axle position. Only axle deflections above the minimum position are transmitted to the valve and a lever ratio is incorporated which ensures that only a desired proportion of the axle deflection in excess of the minimum position is transmitted to the valve to vary the cut-in point in dependence upon the vehicle suspension deflection.

In one proposed load sensing assembly the lever ratio is provided by a rubber disc and pistons of different areas working in respective cylinders act on opposed faces of the disc. The larger piston is subjected to the full road spring force and a reduced force is transmitted by the rubber disc to the smaller piston which transmits the load to the valve member. In practice, due to the structure of the material, suitably of the mineral-oil-resistant type, a number of disadvantages occur. The force-transmission curve with reference to stroke is not steady, but steep and short, so that such a disc is able to transmit a proportional reaction force over only a relatively limited range. Moreover, due to the constant resilient deformation of the material, the rubber disc is subject to relatively heavy wear, so that the deformation characteristic is always changing. Thus, the rubber disc must be replaced after a relatively short period of operation. The rubber disc becomes relatively non-deformable at low temperatures so that the full spring load cannot be transmitted to the valve control member. This has the result that the rear brake pressure is not reduced, but is fully applied. There is therefore a danger in a cold environment of the brakes being locked.

According to my invention, a vehicle load-sensing assembly for use with a vehicle fluid-pressure braking system comprises an input member subjected to the force in a road spring, a valve having a movable valve member for controlling the flow of fluid through the valve, and a thrust transmitting mechanism located between the input member and the valve member, the thrust transmitting mechanism comprising relatively movable parts, and camming means disposed between the parts for transmitting movement between the parts to control operation of the valve member.

Conveniently the thrust transmitting mechanism comprises a rotary operating plate acting on the input member, and the camming means are disposed between the operating plate and a relatively fixed reaction plate for translating axial movement of the input member into rotary movement of the operating plate and vice versa, and transmission means for transmitting rotary movement of the operating plate to the valve member to regulate the flow of fluid through the valve.

Preferably the camming means comprise balls, or rollers, and inclined circumferentially extending ramp surfaces are provided in adjacent faces of the operating plate and the reaction plate between complementary pairs of which each ball or roller co-operates. Thus, rotation of the operating plate relative to the reaction plate will cause the balls or rollers to ride up the ramps thereby causing the operating plate to move axially away from the reaction plate. The degree of movement of the operating plate which is determined by the angle of the ramps and the loading on the vehicle is transmitted through the transmission means, and the axial movement of the operating plate urges the input member relatively away from the reaction plate.

In one construction the transmission means comprises a valve operating thrust plate which is held against rotation but is guided for axial movement, and second camming means are located between the thrust plate and the operating plate so that rotation of the operating plate causes axial movement of the thrust plate and vice versa.

Preferably, the valve member comprises a piston working in a bore, and the thrust plate is guided in a counterbore and acts directly on the piston.

In another construction the transmission means comprises a lever which is carried by a boss retatable with the thrust plate. In such a construction the free end of the lever acts on the valve member, which preferably comprises a piston working in a bore of which the axis is normal to the axis of a bush in which the boss is rotatable.

In a modified construction the thrust transmitting mechanism comprises a reaction plate which is rigid with the input member, and the camming means are disposed between the reaction plate and a thrust plate through which the lower free end of the valve member extends towards the reaction plate.

In this modified construction the camming means comprise balls or rollers guided in radially arranged recesses in adjacent faces of the plates, and the free end of the valve member is provided with an inclined ramp surface so that displacement of the valve member towards the input member separates the balls or rollers which, in turn, act to move the reaction plate away from the thrust plate.

The camming means are constructed and arranged to maintain the relative movements of the input member and the valve member in a predetermined relationship. For example, for a travel of the valve member of, say 0.10 ins, the input member will typically move through 0.02 ins at most. Thus, the load of the road spring remains substantially constant for a given axle load.

Three embodiments of our invention are illustrated in the accompanying drawings in which.

Figure 1:
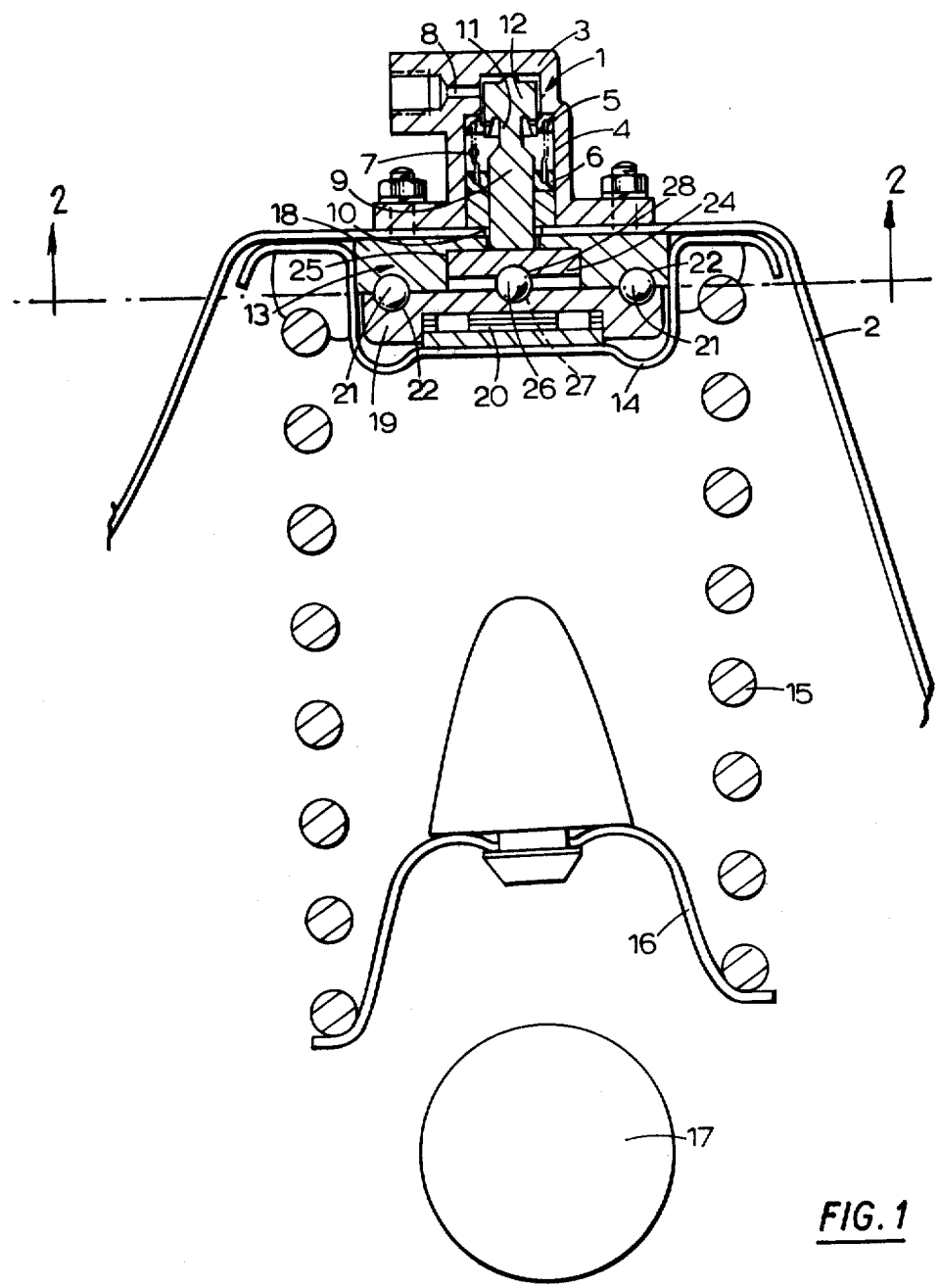
FIG. 1 is a transverse section through a load-sensing assembly for a vehicle brake system.
Figure 2:
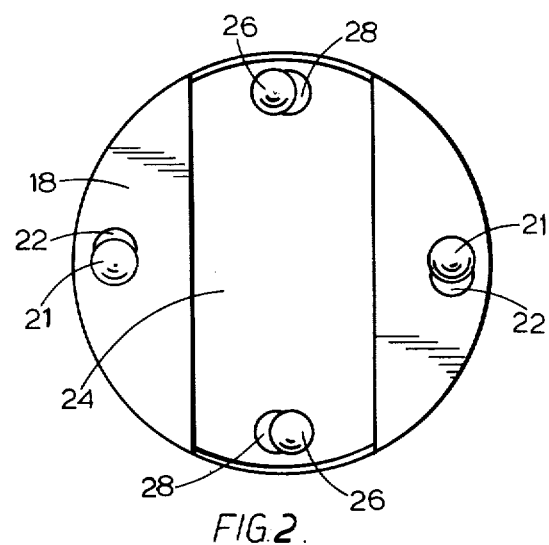
FIG. 2 is a section on the line 2—2 of FIG. 1.

The load-sensing assembly illustrated in FIGS. 1 and 2 of the accompanying drawings comprises a pressure reducing valve 1 mounted on the chassis 2 of a vehicle and comprising a housing 3 having a stepped bore 4 which is closed at its end which is of smaller diameter, and spaced seals 5 and 6 are located at opposite ends of the larger diameter portion. An inlet port 7 for connection to a pedal-operated hydraulic master cylinder communicates with the space between the seals 5 and 6 and an outlet port 8 for connection to brakes on rear wheels of a vehicle communicates with the bore adjacent to its closed end on the outer side of the seal 5. A valve member comprising a piston 9 projects downwardly through the seal 6 and an opening 10 in the chassis 2. At its opposite end the valve member has a stem 11 of reduced diameter which extends through the seal 5 and carries an enlarged head 12 for sealing engagement in the seal 5, which has an internal diameter greater than that of the seal 6. Thus the position of the piston 9 regulates the supply of fluid from the master cylinder to the brakes.

Operation of the valve 1 is controlled in accordance with the loading on the vehicle by a thrust transmitting mechanism 13 interposed between the piston 9 and a load input member 14 comprising an abutment for the upper end of a road suspension spring 15 of which the lower end abuts against an abutment 16 on the rear wheel axle 17. The thrust transmitting mechanism 13 comprises a reaction plate 18 bolted to the underside of the chassis 2 against relative movement, conveniently by common mounting bolts for the housing 3, and a rotatable operating plate 19 with a thrust bearing 20 located between the input member 14 and the operating plate 19. Balls or rollers 21 are located in complementary circumferentially extending angularly spaced recesses 22 in adjacent faces of the plates 18 and 19 which recesses define ramps along which the balls or rollers 21 are movable to affect relative axial movement between the plates 18 and 19, for example separation, in response to rotation of the plate 19, or rotation of the plate 19 in response to axial movement of the plates 18 and 19 towards each other.

The thrust transmitting mechanism 13 acts on the free lower end of the piston 9 through a thrust plate 24 which is held against rotation and which is guided for relative axial movement, in a recess 25 in the reaction plate 18 into which the piston 9 projects. Balls or rollers 26 are located in complementary circumferentially extending angularly spaced recesses 27 and 28 in adjacent faces of the plates 19 and 24 respectively.

The ramp angles of the recesses 22, 27, 28 are chosen such that for a given travel of the piston 9, say 0.10 ins, the input member 14 moves typically 0.02 ins at the most.

In normal operation the piston 9 is subjected to an axial force so that fluid is supplied from the inlet port 7 to the outlet port 8 past the head 12 which is held away from a seating defined by the seal 5. This continues until a cut-in pressure is reached at which the resultant pressure force acting on the piston 9 is sufficient to overcome the axial force of the spring 15 acting through the ramps 22 with the result that the head 12 moves into engagement with the seating 5 to close the valve. Further increases in inlet pressure cause reciprocation of the piston 9 to meter the flow between the inlet 7 and the outlet port 8 in a known manner. If the inlet pressure is reduced to a value below the outlet pressure, the fluid flows in the opposite direction, from the outlet port 8 back to the inlet port 7.

When the load on the road spring 15 is increased, for example when the vehicle is fully laden, the pressure acting on the valve 1 which will be required to overcome the road spring 15 via the thrust transmitting mechanism 13 is increased proportionally. Thus a higher pressure can be applied to the rear wheel brakes from the outlet port 8, before the valve 1 can close as described above.

When the force in the road spring 15 is overcome the piston 9 moves downwardly towards the axle 17 to generate a torque on the plate 19 through the balls and ramps 26, 27 and 28. This causes the plate 19 to rotate and this rotation separates the plate 19 from its engagement with the reaction plate 18, via the balls and ramps 21, 22, against the force in the spring 15. Above this pressure the valve 1 meters fluid to the rear brakes at a reduced rate, in a conventional manner.

Figure 4:
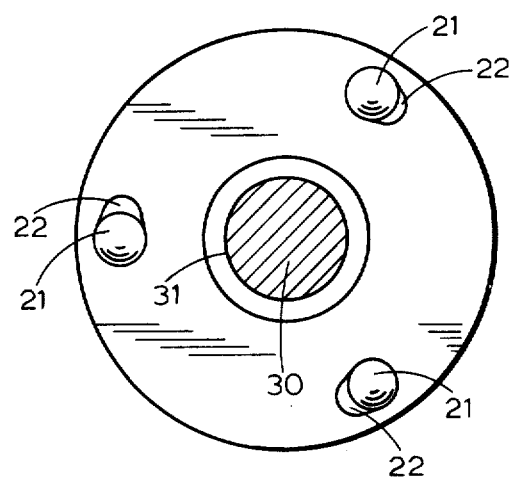
FIG. 4 is a section on the line 4—4 of FIG. 3.
Figure 3:
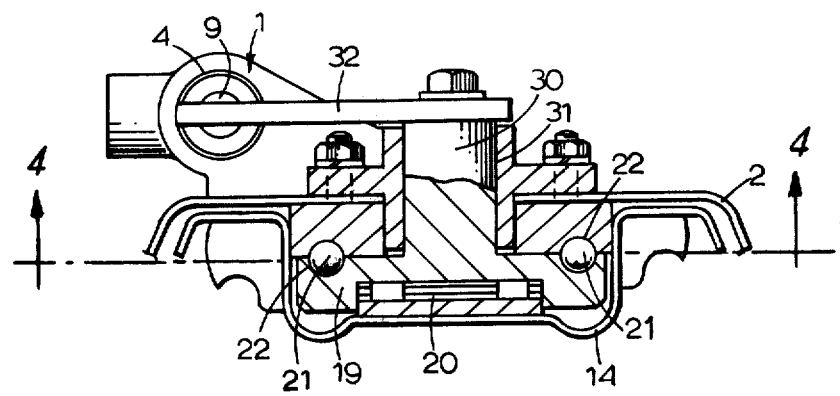
FIG. 3 is a transverse section through the upper portion of the assembly of FIG. 1, but showing a modification.

In the modified construction of FIGS. 3 and 4, the thrust plate 24 and the balls or rollers 26 are omitted. The operating plate 19 is carried by a boss 30 which is journalled for rotation in a bushing 31 in the housing 1 and the free end of the boss 30 is rigid with a lever 32. The lever 32 acts on the free end of the piston 9, and the bore 4 in which the piston 9 works is located at right angles to the axis of the bushing 31.

In the construction of FIGS. 3 and 4 rotation of the operating plate 19 is accompanied by angular movement of the lever 32 to change the "cut-in" point of the valve in accordance with changes in the loading of the vehicle, as described above.

The construction and operation of the embodiment of FIGS. 3 and 4 is otherwise the same as that of FIGS. 1 and 2 and corresponding reference numerals have been applied to corresponding parts.

Figure 6:
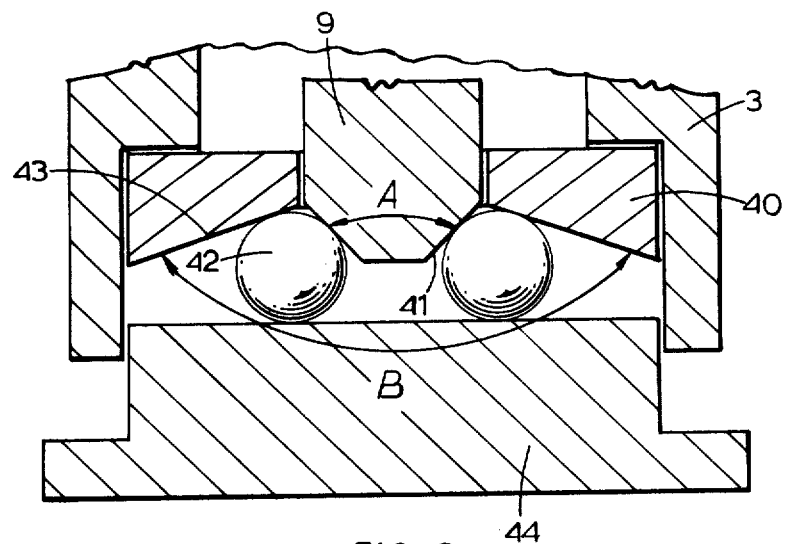
FIG. 6 is a detailed partial sectional view on an enlarged scale of the thrust transmitting mechanism incorporated in the load-sensing assembly of FIG. 5.
Figure 5:
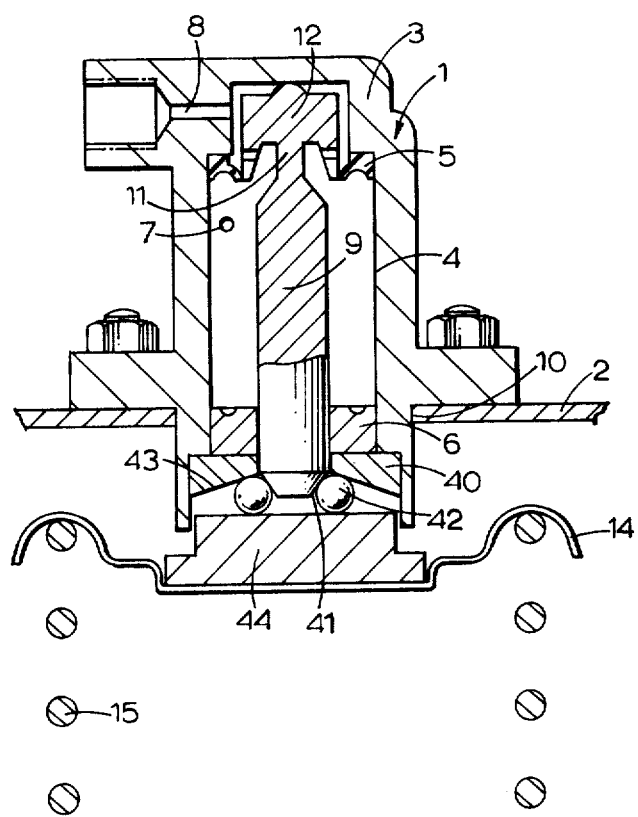
FIG. 5 is a transverse section through another load sensing assembly.

In the embodiment of FIGS. 5 and 6, the free lower end of the valve member 9 projects through the seal 6 and an opening in a fixed thrust plate 40. The free end is provided with a continuous ramp surface 41 acting on a series of balls or rollers 42 which are located in inclined radial recesses 43 in the lower surface of the thrust plate 40. The balls or rollers 42 are trapped against the flat upper surface of a reaction plate 44 rigid with the input member 2.

The ramp angle "B" (FIG. 6) is greater than the ramp angle "A" so that, in operation, downward movement of the valve member 9 causes the balls or rollers 42 to move outwardly in a radial direction, in turn, urging the reaction plate 44 away from the thrust plate 40.

The construction and operation of the embodiment of FIGS. 5 and 6 is otherwise the same as that described in FIGS. 1 and 2, and FIGS. 3 and 4, and corresponding reference numerals have been applied to corresponding parts.

In the constructions described above the pressure reducing valve 1 acts to apportion pressure above the "cut-in" point. By making the head 12 and the piston 9 equal in diameter, the valve 1 will act as a pressure limiting valve simply to cut-off communication between the inlet port 7 and the outlet port at the "cut-in" point.

I claim:

1. A vehicle load-sensing assembly for use with a vehicle fluid-pressure braking system comprising an input member subjected to a force in a road spring, a valve having a movable valve member for controlling the flow of fluid through said valve, and a thrust transmitting mechanism located between said input member and said valve member, wherein said thrust transmitting mechanism comprises a rotary operating plate acting on said input member, a relatively fixed reaction plate, camming means disposed between said operating plate and said reaction plate for translating axial movement of said input member into rotary movement of said operating plate and vice versa, and transmission means for transmitting rotary movement of said operating plate to said valve member to regulate the flow of fluid through said valve.

2. A vehicle load-sensing assembly as claimed in claim 1, wherein said camming means comprise balls or rollers, and inclined circumferentially extending ramp surfaces are provided in adjacent faces of said operating plate and said reaction plate, each said ball or roller co-operating between a corresponding pair of said ramps.

3. A vehicle load-sensing assembly as claimed in claim 1, wherein said transmission means comprises a valve operating thrust plate, means for holding said thrust plate against rotation, but permitting axial movement, and second camming means are located between said thrust plate and said operating plate so that rotation of said operating plate causes axial movement of said thrust plate and vice versa.

4. A vehicle load-sensing assembly as claimed in claim 3, wherein said valve member comprises a piston working in a bore, and said thrust plate is guided in a counterbore and acts directly on said piston.

5. A vehicle load-sensing assembly as claimed in claim 1, wherein a boss is rotatable with said thrust plate, and said transmission means comprises a lever which is carried by said boss, said lever having a free end which acts on said valve member.

6. A vehicle load-sensing assembly as claimed in claim 5, wherein said boss is rotatable in a bush, and said valve member comprises a piston working in a bore of which the axis is normal to the axis of said bush.

* * * * *